US010432394B2

(12) United States Patent
Hook et al.

(10) Patent No.: US 10,432,394 B2
(45) Date of Patent: Oct. 1, 2019

(54) METHOD AND SYSTEM FOR SHARING ENCRYPTED CONTENT

(71) Applicant: KL Data Security Pty Ltd, Chirnside Park (AU)

(72) Inventors: David Geoffrey Hook, Ascot Vale (AU); Richard Hans Harvey, Ringwood East (AU); Peter Kai Dettman, South Yarra (AU)

(73) Assignee: KL DATA SECURITY PTY LTD, Chirnside Park (AU)

( * ) Notice: Subject to any disclaimer, the term of this patent is extended or adjusted under 35 U.S.C. 154(b) by 0 days.

(21) Appl. No.: 14/329,060

(22) Filed: Jul. 11, 2014

(65) Prior Publication Data

US 2014/0325231 A1 Oct. 30, 2014

Related U.S. Application Data

(63) Continuation of application No. 13/583,490, filed as application No. PCT/AU2011/000260 on Mar. 8, 2011, now abandoned.

(30) Foreign Application Priority Data

Mar. 9, 2010 (AU) ................................ 2010900973

(51) Int. Cl.

| | |
|---|---|
| ***G06F 21/62*** | (2013.01) |
| ***H04L 9/08*** | (2006.01) |
| ***G06F 21/10*** | (2013.01) |
| ***H04L 29/06*** | (2006.01) |

(52) U.S. Cl.

CPC ............ *H04L 9/0822* (2013.01); *G06F 21/10* (2013.01); *G06F 21/62* (2013.01); *H04L 9/088* (2013.01); *H04L 63/0435* (2013.01); *H04L 63/065* (2013.01); *H04L 63/104* (2013.01); *H04L 2209/24* (2013.01); *H04L 2209/60* (2013.01)

(58) Field of Classification Search

CPC ... H04L 63/101; H04L 63/102; H04L 63/104; G06F 21/62; G06F 21/6209; G06F 21/602

See application file for complete search history.

(56) References Cited

U.S. PATENT DOCUMENTS 6,581,162 B1 * 6/2003 Angelo ................ G06F 21/602 380/277
7,395,436 B1 7/2008 Nemovicher
7,921,284 B1 4/2011 Kinghorn et al.
7,930,756 B1 * 4/2011 Crocker ............. G06F 21/6209 705/57

(Continued)

*Primary Examiner* — David J Pearson
(74) *Attorney, Agent, or Firm* — Seed IP Law Group LLP

(57) ABSTRACT

The present invention relates to the field of sharing encrypted content. In one form, the invention relates to multiple user access and management of encrypted content. In one particular aspect, the present invention is suitable for use in community controlled encryption of shared content using indirect keys.

The present invention relates to the use of encrypted intermediate key(s), such as an encrypted community key and/or workspace key. A changeable group of users is associated with a community key. Changeable set of content is associated with a workspace key. The present invention also uses permits in association with encrypted keys.

24 Claims, 3 Drawing Sheets

(56) References Cited

U.S. PATENT DOCUMENTS

| | | | | |
|---|---|---|---|---|
| 8,006,280 | B1* | 8/2011 | Hildebrand | G06F 21/6218 380/277 |
| 2003/0110131 | A1 | 6/2003 | Alain et al. | |
| 2004/0158709 | A1* | 8/2004 | Narin | G06F 21/10 713/156 |
| 2005/0039034 | A1* | 2/2005 | Doyle | H04L 9/0825 713/193 |
| 2005/0154890 | A1 | 7/2005 | Vembu | |
| 2005/0251491 | A1 | 11/2005 | Medina et al. | |
| 2006/0179478 | A1* | 8/2006 | Han | H04L 9/0822 726/5 |
| 2006/0190715 | A1 | 8/2006 | Miller | |
| 2007/0100913 | A1* | 5/2007 | Sumner | G06F 11/1453 |
| 2007/0288386 | A1* | 12/2007 | Adachi | G06F 21/10 705/58 |
| 2009/0222741 | A1* | 9/2009 | Shaw | G06Q 10/109 715/753 |
| 2010/0095122 | A1* | 4/2010 | Bettger | H04L 12/1831 713/170 |
| 2010/0235649 | A1* | 9/2010 | Jeffries | G06F 21/6209 713/189 |
| 2010/0296655 | A1* | 11/2010 | Solow | G06F 21/10 380/279 |
| 2010/0325732 | A1* | 12/2010 | Mittal | G06F 21/604 726/26 |
| 2013/0212151 | A1* | 8/2013 | Herbach | H04L 67/42 709/203 |
| 2013/0318347 | A1 | 11/2013 | Moffat | |

* cited by examiner

METHOD AND SYSTEM FOR SHARING ENCRYPTED CONTENT

CROSS REFERENCE TO RELATED APPLICATIONS

This is a Continuation of application Ser. No. 13/583,490 filed Nov. 13, 2012, claiming priority based on International Application No. PCT/AU2011/000260 filed on Mar. 8, 2011, which claims priority from Australia Patent Application No. 2010900973, filed on Mar. 9, 2010, the contents of all of which are incorporated herein by reference in their entirety.

FIELD OF INVENTION

The present invention relates to the field of sharing encrypted content.

In one form, the invention relates to multiple user access and management of encrypted content.

In one particular aspect, the present invention is suitable for use in community controlled encryption of shared content using indirect keys.

It will be convenient to hereinafter describe the invention in relation to sharing of encrypted content, however it should be appreciated that the present invention is not limited to that use only.

BACKGROUND ART

Throughout this specification the use of the word "inventor" in singular form may be taken as reference to one (singular) inventor or more than one (plural) inventor of the present invention.

The inventors have identified a number of problems with secure sharing of encrypted information.

Many systems rely on the security of third party services. The inventors have identified that in the case of third party controlled services, including "cloud" storage, remote server storage and other application service providers, the access to the information stored requires the third party to prevent accidental or unwilling disclosure e.g. via mistake, a security breach, legal demand etc and requires control of any related encryption keys by that third party.

Other systems provide user controlled encryption of information and tend to use public/private keys or password generated keys for that encryption. The inventors have identified that these systems have relatively defined sets of users and are also relatively rigid and tend to have difficulty with dynamic and/or efficient management such as scaling, distributed storage, changing group memberships and revocation.

More generally, prior art security systems that deal with encrypted information (including third party and/or user controlled) tend to rely on one or any combination of the following assumptions:

A trusted authority e.g. government, service provider or other third party

Storage system managed keys e.g. encrypted file systems, encrypted databases

Proof of identity e.g. Public Key Infrastructure (PKI)

Password based credentials e.g. file transfer systems

Encryption of information using private keys or password generated keys e.g. document systems A single user e.g. private secure storage Message based encryption e.g. email encryption software Group protocols e.g. multi-cast key management Transfer based encryption e.g. Secure Sockets Layer (SSL)

Online availability e.g. peer-to-peer services

It is to be appreciated that any discussion of documents, devices, acts or knowledge in this specification is included to explain the context of the present invention. Further, the discussion throughout this specification comes about due to the realisation of the inventor and/or the identification of certain related art problems by the inventor. Moreover, any discussion of material such as documents, devices, acts or knowledge in this specification is included to explain the context of the invention in terms of the inventor's knowledge and experience and, accordingly, any such discussion should not be taken as an admission that any of the material forms part of the prior art base or the common general knowledge in the relevant art in Australia, or elsewhere, on or before the priority date of the disclosure and claims herein.

SUMMARY OF INVENTION

An object of the present invention is to alleviate at least one disadvantage associated with the related art.

It is an object of the embodiments described herein to overcome or alleviate at least one of the above noted drawbacks of related art systems or to at least provide a useful alternative to related art systems.

In a first aspect of embodiments described herein there is provided a method of and/or application adapted to enable encryption and/or decryption of content, comprising providing a first key adapted for use with the content, providing a second key which defines a set of one or more additional keys, and encrypting and/or decrypting using the first key and the second key.

In another aspect of embodiments described herein there is provided a method of and/or application adapted to enable encryption and/or decryption of content, comprising a community key representing at least one user, a workspace key representing at least one content, and performing encryption and/or decryption using the community and workspace keys.

In yet another aspect of embodiments described herein there is provided a method of and/or application adapted to encrypt and/or decrypt content, comprising enabling the encryption in accordance with a method as herein disclosed.

In a further aspect of embodiments described herein there is provided a method of and/or application adapted to define an association between at least one user and at least one encrypted content, comprising providing each user with a user key, and providing a user with a permit relative to the content, the permit comprising encrypted first and second keys.

In yet a further aspect of embodiments described herein there is provided a system adapted to enable encryption and/or decryption of content, comprising a first key register adapted to associate a first key with content, a second key register adapted to associate a second key with one or more additional keys and an encryption engine adapted to encrypt and/or decrypt using the first key and the second key.

In still a further aspect of embodiments described herein there is provided, in combination, a system as herein disclosed and a content management system, a messaging system, a file management system, a systems management system and/or a collaboration system.

Other aspects and preferred forms are disclosed in the specification and/or defined in the appended claims, forming a part of the description of the invention.

In essence, embodiments of the present invention stem from the realization that scalable encryption can be provided by the use of encrypted intermediate key(s), such as an encrypted community key and/or workspace key. A changeable group of users is associated with a community key. Changeable set of content is associated with a workspace key. In a further embodiment of the present invention, the workspace key may be encrypted/decrypted by the community key and vice versa.

By defining the relative association of the community key and the workspace key with users and content respectively, the present invention enables many advantages and features, such as security, privacy, flexibility, storage, streams, distribution, efficiency, scalability and manageability.

Advantages relating to security include, without limitation:

- Security keys are controlled by the client and not reliant on a third party or organisation.
- Information remains secure, as encryption and decryption is performed by the client and not reliant on a storage system or third-party service.
- Provides certificate based credentials including different credentials for signing, encryption and communications
- Allows for digital signatures and the use of trusted time-stamping service
- Transferring of encrypted information within the System may not necessarily require transfer based encryption e.g. Secure Sockets Layer (SSL) as information is transferred in an encrypted form.
- Allows remote storage, perhaps on a server or using a service that may not be necessarily fully trusted. e.g. to a third party or outsourced information technology provider, as information remains in an encrypted form outside the client.
- Revocation can be relatively easily managed because of the ease to which a member can be removed from a group of users or community.
- Sharing of keys and other parameters can be performed on a strictly "need to know" basis. That is, each user may be limited to information that is relevant to them, without the ability to access information relevant to other users.
- Ability to secure end-to-end streams of content rather than just point-to-point.

Advantages relating to privacy include, without limitation:

- Allows encrypted content to be shared with other users without necessarily relying on a central authority and/or registration authority.
- Allows users to build their own "web of trust" with a relatively secure way to handle invitations and revocation.
- Allows users to be known by a label not necessarily associated with anyone or anything. Additionally, the registration process does not require proof of identity.

Advantages relating to flexibility include, without limitation:

- Ability to accommodate arbitrary types and formats of Content e.g. files, records, streams, text, binary, multimedia etc.
- Ability to accommodate arbitrary number and types of Communities e.g. unpredictable, transient, complex, overlapping, disjoint etc.
- Ability to accommodate arbitrary groups of Content (Workspaces) to be sharable with arbitrary Communities.
- Ability to interface to existing applications, security systems, identity systems, document systems and other management systems.

Advantages relating to storage include, without limitation:

- Storage servers need relatively small processing power as it is not necessary for them to be able to perform encryption and/or decryption functions.
- Storage management may be relatively low cost and/or a relatively basic service for storing and retrieving encrypted content, as there is no need for storage providers to be able to manage storage keys, maintain encrypted file systems and/or encrypted databases etc.
- Is relatively efficient in storage as it does not require a separate copy of encrypted information for each user as is the case with other approaches e.g. message based encryption, email encrypting software.
- Allows high availability by storing multiple copies of encrypted content, for example on different local disks, and/or different servers and/or different third party storage services.

Advantages relating to streams and distribution include, without limitation:

- Ability to operate in a continuous and/or bi-directional encrypted stream allowing for ongoing interactions, collaborations, sessions, conversations etc. between users and/or applications.
- Ability to operate in a distributed manner with other client controllers, which enables secure, encrypted multi-way streams between any combination of users and/or applications.
- Ability to dynamically handle changing membership of a community which is using a stream.
- Ability to handle attachments related to a stream.
- Ability for users to join and leave encrypted streams as required in a relatively efficient way.
- Ability to handle relatively large encrypted content as a stream.

Advantages relating to efficiency include, without limitation:

- Low computing overhead as changing a group of users simply requires encrypting of keys and not necessarily re-encrypting content.
- Low network costs as encrypted content need not be changed on the server when users are added or removed from groups and/or communities. For example, the present invention does not require encrypted content to be downloaded, re-encrypted and uploaded when there are changes to the set of users that need to access and/or manage the encrypted content.
- The system may be implemented on a wide variety of platforms, such as mobile devices, because of its relative efficiency e.g. low network usage, low computational requirements etc.
- Encrypting and decrypting content is relatively efficient through the use of symmetric keys rather than private keys.
- Key management is relatively efficient through the use of symmetric keys with relatively few private/public key operations required.

Advantages relating to scalability include, without limitation:

- The ability to manage large sized content and/or large numbers of content items and/or many versions of content items as additional encryption operations on content is not required to accommodate changes in the membership of groups of users and/or the organisation of content.

- Ability to manage relatively dynamic and/or large and/or complex groups of users (communities) as the overhead of changing memberships is relatively low.
- Ability to bulk update groups of users, as new sets of encryption keys can be relatively easily calculated and the system can continue to work whilst in transition from one set to another.
- Being mostly independent of whether users are online or offline, unlike other systems that require groups to be online e.g. group communications, online collaboration, multi-cast key management systems, peer-to-peer services etc.

Advantages relating to manageability include, without limitation:

- Relative safety of adding or retiring users as each step in the process can be done in a relatively fault tolerant and progressive way, including the ability to restart and/or rollback.
- Can seamlessly transition from one shared encryption key to a new one as all copies of keys need not be necessarily updated at the same time.
- Continued availability of encrypted content even if the addition or removal of users takes time and/or needs to be rolled back or restarted.
- Multiple versions of encrypted content can be maintained through the use of versioned encrypted keys.
- Ability to define arbitrary Workspaces which may include arbitrary types and amount of Content and overlapping content.
- Ability for Content to be moved and/or copied between Workspaces in a relatively efficient way.

Throughout this specification, the word "content", without limitation, comprises any information communicable in a digital form. Examples comprise, without limitation, files, records, streams, protocols, conversations, sessions, backups, database journals, audit trails, logs, documents, presentations, spreadsheets, messages, multi-media, pictures, video, music, audio, radio, indicia, tickets, keys, passwords, configuration, entries, indexes, executables, data stores, application data, state information, system information or any other electronic information and/or any derivation of information such as compressed, translated, scanned, signed, watermarked, packaged, compiled, aggregated, segmented, transformed etc.

Throughout this specification, the word "key", without limitation, comprises any representation used in association with or operable on an encryption algorithm that enables encryption or decryption of information, such as, without limitation, asymmetric keys, symmetric keys, secret keys, public keys, private keys, password keys, one-time password keys, tickets, tokens, certificates, etc.

Throughout this specification, the word "parameters", without limitation, comprises any information associated with the content and/or key, such as, without limitation, names, sizes, timestamps, versions, authors, keywords, locations, policies, identifiers, descriptions, relationships, owners, security levels, capabilities, communities, groups, privileges, access restrictions, versions, auditing, configuration, controls etc.

Further scope of applicability of embodiments of the present invention will become apparent from the detailed description given hereinafter. However, it should be understood that the detailed description and specific examples, while indicating preferred embodiments of the invention, are given by way of illustration only, since various changes and modifications within the spirit and scope of the disclosure herein will become apparent to those skilled in the art from this detailed description.

BRIEF DESCRIPTION OF THE DRAWINGS

Further disclosure, objects, advantages and aspects of preferred and other embodiments of the present application may be better understood by those skilled in the relevant art by reference to the following description of embodiments taken in conjunction with the accompanying drawings, which are given by way of illustration only, and thus are not limitative of the disclosure herein, and in which.

DETAILED DESCRIPTION

System Overview

Figure 1:
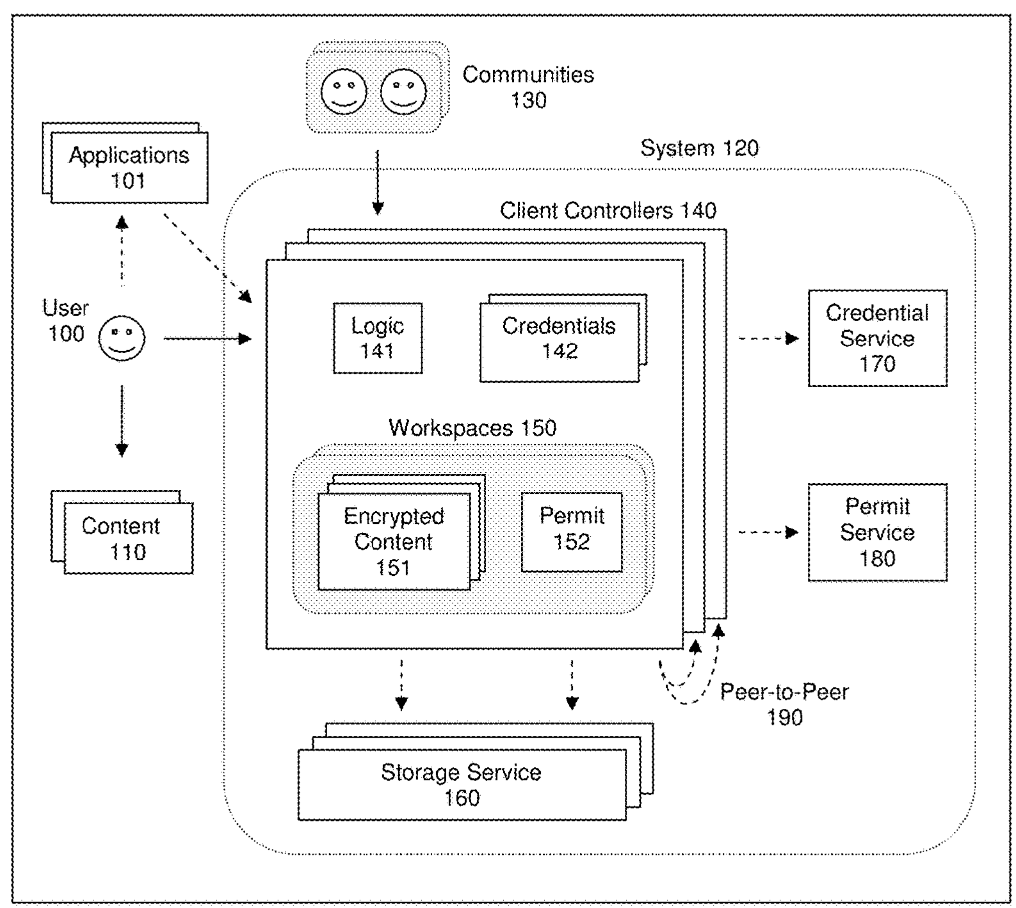
FIG. 1 illustrates an embodiment of the present invention.

FIG. 1 illustrates an embodiment of the present invention.

Users 100 interact with the System 120 to securely store, access and manage encrypted versions and/or derivations of Content 110. A User 100 is an entity such as a person, organisation, application, service or any other interface. A User 100 may interact with other users, for example to setup trust relationships and/or organise groups or Communities 130. Users 100 may have different privileges on the System 120, for example upload, download, change groups, change rights, create workspaces, create communities etc. Users 100 interact with Client Controllers 140 and may also interact with a Credential Service 170.

Content 110 may be shared between Users 100 and/or Applications 101 and/or stored in System 120. Examples of Content 110 include files, records, application data and data streams. Examples of files include documents, word processing files, presentations, spreadsheets, notes, messages, pictures, multi-media, maps, indicia, executables, packages and any other type of storable information. Examples of records include database fields, directory entries, registry entries, spreadsheet cells, messages, data blocks, indexes and any other type of partitioned information. Examples of application data include keys, passwords, address books, calendar data, configuration information, data stores, state information and any other type of application information. Examples of data streams include multi-media streams, communications streams and application streams. Examples of multi-media streams include video, audio, pictures and any other type of on-demand data. Examples of communications streams include VoIP (Voice Over IP), HTTP (HyperText Transfer Protocol), instant messaging, shared collaboration or any other type of protocol. Examples of application streams include collaboration applications, monitoring, backups, database journals, logs, audit trails or any other type of runtime information. Content 110 also includes any derivation of information such as compressed, translated, watermarked, packaged, check-summed, aggregated, segmented, and/or any other electronic forms of information. Content 110 may be human readable such as text, Portable Document Format (PDF), postscript etc. and/or may be binary such as compressed, compiled, packaged etc. Content 110 may be public with the purpose of storing securely, for example, to establish the authorship and/or date of documents e.g. original works. Content 110 may also be non-public and includes any information that may need to be restricted to a limited set of Users 100, such as confidential, sensitive, classified and/or private information.

Applications 101 are programs that may use Client Controllers 140 to share Content 110 with other Applications 101 and/or Users 100. Applications 101 may use an Application Programming Interface (API) with Client Controllers 140 and/or provide a graphical or other human interface to a User 100. Applications 101 may include any type of distributed application such as collaboration, content creation, file management, systems management and/or communications capabilities. Examples may include email, instant messaging, calendaring, communal editing, social networking, real-time interactions, monitoring, management, control, transactions, document management, virtual file systems and any other type of multi-user activity etc. Applications 101 may utilise System 120 to provide such applications with features such as distributed end-to-end encryption, Community management, Workspace management, User management, Credential management and other features described herein.

The System 120 may be considered to have a number of functional components, such as Client Controllers 140, Storage Service 160, Credential Service 170, and Permit Service 180. The Services may be optional and/or may be provided externally to System 120. These components represent functional mechanisms and may be combined in different ways such as into one or more applications involving one or more servers. These applications and/or servers may be independent and/or distributed and/or replicated. Additionally, components such as the Credential Service 170 may perform related functions such as a Certificate Service, Registration Service, Authentication Service, Escrow Service etc.

Communities 130 represent collections of one or more Users 100. A User 100 may be a member of one or more Communities 130. A Community 130 may be setup to have access to Workspace 150 using a Permit 152 to access and manage associated Encrypted Content 151.

Client Controllers 140 provide the interface to, and control of, the System 120 for Users 100. Client Controllers 140 manage interactions with other parts of the System 120. For example to encrypt, decrypt, login, manage memberships, register etc. The Client Controller 140 may have Logic 141 for managing the system and may store information such as Credentials 142.

Credentials 142 may include information that is unique to a particular User 100, such as a certificate (containing a public key) and associated private key. A User 100 may have one or more Credentials 142 for different purposes for example, for signing, communications and/or encryption. Credentials 142 may comprise any form of identification such as username, passwords, tokens, tickets and/or any other information used for authentication. Credentials 142 may be protected, such as stored in a cryptographic keystore.

Workspaces 150 may contain logical groupings of Encrypted Content 151. Encrypted Content 151 may be a part of any number of Workspaces 150. Each Workspace 150 may have an associated Permit 152 and may have an associated Community 130. In a preferred embodiment, Workspaces 150 may be considered as defining a set of Encrypted Content 151 for which an associated Community 130 can share, access and/or manage this set using an associated Permit 152. A Workspace 150 may also provide one or more streams which may allow a Community 130 to share Encrypted Content 151 in a non-discrete way, for example applications which may be open-ended, concurrent, continuous, real-time, dynamic, interactive etc. and/or in distributed fields such as collaboration, web applications, systems management, monitoring, control etc.

Encrypted Content 151 is Content 110 that has been encrypted. Information about the encryption, including encryption keys, cryptographic algorithm etc and other information about the Content 110 may be stored in a Permit 152. Encrypted Content 151 may relate back to the corresponding Content 110 in a one-to-many, many-to-many and/or many-to-one relationship. That is, one or many items of Content 110 may relate to one or many items of Encrypted Content 151. In addition, one or more versions of Content 110 may be retained as Encrypted Content 151. Encrypted Content 151 may be stored in one or more Storage Service 160 mechanisms and/or locations and/or shared with other Client Controllers 140 using Peer-to-Peer 190 mechanisms. Encrypted Content 151 may also be replicated within or across Storage Services 160. Encrypted Content 151 may be a stream or discrete units.

Permits 152 provide information necessary for Client Controllers 140 to perform operations. Permits 152 may include certificates, encrypted keys, and/or Parameters. Parameters may include Content 110, Community 130, System 120 and other information. Examples of Parameters relating to Content 110 may include name, size, timestamp, versions, author, keywords, location information, session, synchronisation and/or other Content properties. Examples of Parameters relating to Communities 130 may include name, relationships, owners, administrators, privileges and/or other Community 130 properties. Examples of Parameters relating to the system may include policies, identifiers, descriptions, relationships, owners, security levels, communities, groups, privileges, access restrictions, versions, auditing, configuration, controls and/or other system properties. Parameters, or parts of Parameters, may be stored independent of Permits 152, for example system policies. Permits 152 and/or Parameters may be encrypted with a key. A Permit 152 may contain information limited to a given User 100, for example only providing keys and/or Parameters necessary for that user to operate within their Community 130, Workspace 150 and Encrypted Content 151 without necessarily providing other information relevant to other Users 100. The Client Controllers 140 may share Permits 152 directly with each other, for example using Peer-to-Peer 190, and/or use a Permit Service 180 and/or use a Storage Service 160.

The Storage Service 160 may store information such as Encrypted Content 151 and Permits 152. The Storage Service 160 may be local and/or remote. Local storage includes hard disk, portable disk, portable memory, disk array, network disk etc. Remote storage includes network file servers, backup services and other third party storage or "cloud" services. The Storage Service 160 may be on the same machine or a different one to any of the other System 120 components. Storage Service 160 may also store all or parts of Permits 152. Encrypted Content 151 and/or Permits 152 may be distributed and/or replicated in Storage Service 160.

The Credential Service 170 may provide certificate management services such as issuing credentials, managing revocation and providing timestamp services. Issuing of credentials may occur when a User 100 is first initiated into the System 120 and/or used when a User 100 logs in to the System 120. Revocation of credentials may occur when a user is removed from the system and/or a user's credentials need to be re-issued. Revocation status may be provided via Certificate Revocation Lists (CRLs) and/or via an Online Certificate Status Protocol (OCSP). The Credential Service 170 is optional and, if not used, then Client Controllers 140 may need to setup credentials using other means such as manual and/or out-of-band procedures. The Credential Service 170 may be distributed and/or replicated as required. It may also be run separately, fully or in part, by a third party to perform all or some of the credential service functionality. The Credential Service 170 may generate certificates, such as X.509 Certificates or any other cryptographic certificates. Different certificates may be used for different purposes e.g. signing, communications and/or encryption. The Credential Service 170 may also offer an escrow service. The Credential Service 170 may also be another type of security server such as an authentication server, a single sign-on server, a key server etc. and manage other types of credentials such as tokens, tickets, passwords, dynamic passwords etc. The initialisation of keying material (e.g. certificates) may be performed in combination with Client Controllers 140. The registration process for a User 100 with Credential Service 170 may be manual and/or automated and/or centralised and/or distributed. The registration process may be automatic or semi-automatic in the case where pre-existing credentials are leveraged, such as in enterprises or organisations or closed communities which already make use of an identity infrastructure such as a private certificate infrastructure and/or Public Key Infrastructure (PKI).

The Permit Service 180 handles Permits 152 and/or information contained in Permits 152. The Permit Service 180 is optional. The Client Controllers 140 may use the Permit Service 180 to share whole Permits 152 and/or parts of Permits 152. All or some of the Permit Service 180 may be distributed and/or replicated as required. The Permit Service 180 may be provided by any type of service capable of managing Permit 152 information, such a database, registry, directory, repository or other service. Access to a Permit Service 180 via a Client Controller 140 may involve providing appropriate credentials. A Permit Service 180 may restrict information provided to any given Client Controller 140 on a "need to know" basis, for example providing encrypted keys relating to the Community, Workspace and Encrypted Content of a particular User 100 without necessarily providing other information relevant to other Users 100. The Permit Service 180 function may be performed on the same or a different computer from the other parts of the System 120.

Peer-to-Peer 190 may be used to directly exchange information in a Workspace 150 between Client Controllers 140, for example to exchange Encrypted Content 151 and/or Permits 152. The exchange may use a push or pull technique. The Encrypted Content may be relatively continuous such as a stream or conversation, and/or the encrypted content may be in one or more discrete units. Credentials 142 may need to be used to authenticate Client Controllers 140 connecting to each other.

System Relationships

Figure 2:
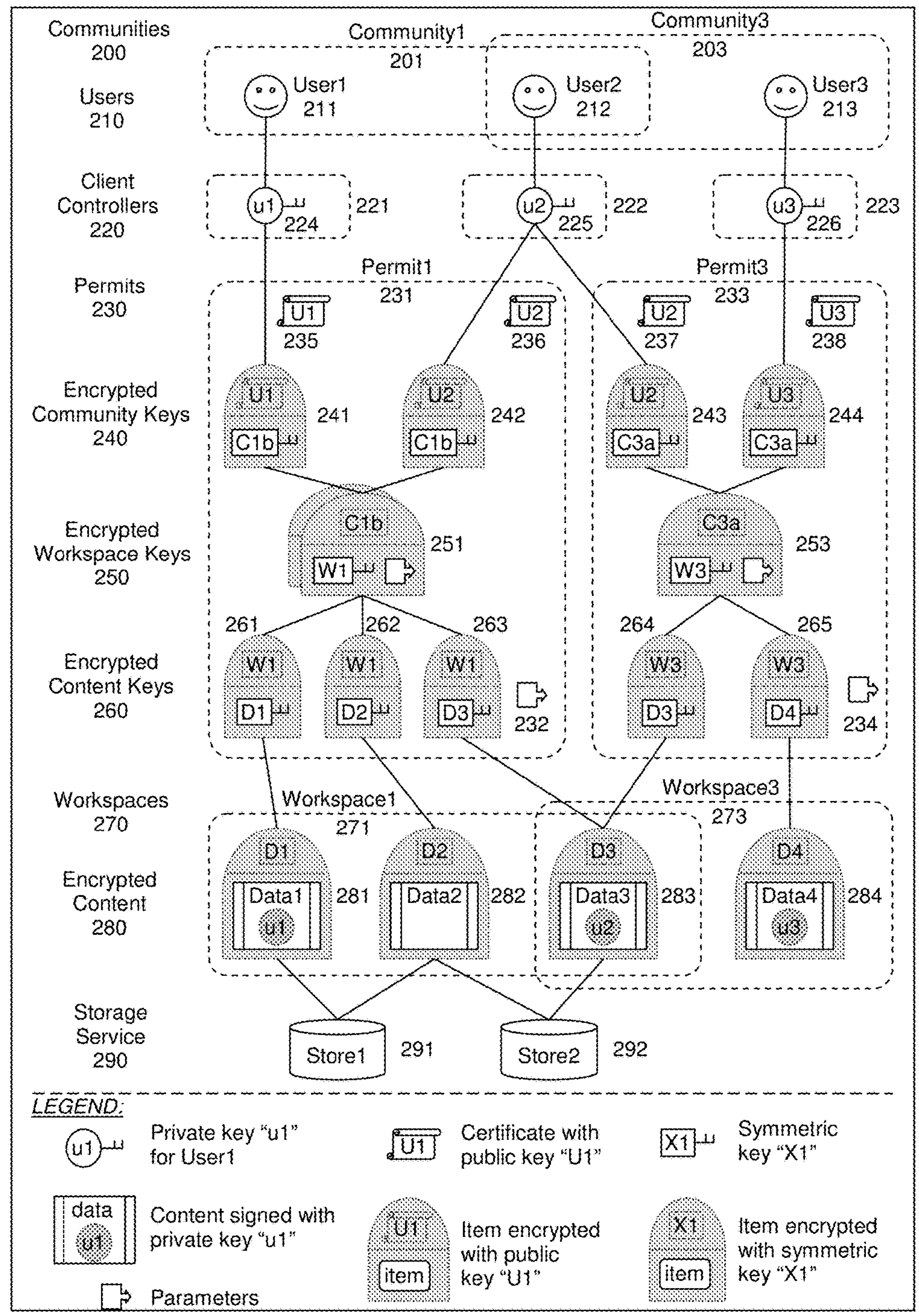
FIG. 2 illustrates relationships in an embodiment of the present invention.

FIG. 2 illustrates relationships in an embodiment of the present invention.

Communities 200 are another representation of those shown in FIG. 1. Communities 200 represent any combination of Users 210. For example, Community1 201 consists of User1 211 and User2 212. In a preferred embodiment, each User belongs to at least one community and/or each User is the administrator of at least one Community. For example, User2 212 may also belong to their own community e.g. Community2 (not shown in FIG. 2).

Users 210 are another representation of Users 100 in FIG. 1. Separate Users 211, 212, 213 are illustrated in FIG. 2. When a User 210 is initialised into the system, they may be automatically added to their own community.

Client Controllers 220 is another representation of those shown in FIG. 1. FIG. 2 shows in particular a private key used for encryption. A Client Controller 220 may also use other private keys such as for signing and/or communications. The private key may be stored securely in a cryptographic keystore associated with a Client Controller 220.

Permits 230 are another representation of information associated with the Permits 152 shown in FIG. 1. FIG. 2 gives an example of the composition of permits (e.g. Permit1 231) which may include certificates (e.g. 235, 236), Parameters (e.g. 232), encrypted keys (e.g. 241, 242, 251, 261, 262, 263) and encrypted Parameters (e.g. 251). In a preferred embodiment, each user (e.g. 212) has a Permit (e.g. 231, 233) for each community (e.g. 201, 203) they belong to. In a preferred embodiment, each Permit (e.g. 231) defines information necessary for an associated user (e.g. 211) to access and manage Encrypted Content (e.g. 281, 282, 283) in an associated Workspace (e.g. 271).

Encrypted Community Keys 240 are used to control which Communities 200 have access to which Workspaces 270. Each Community has an associated symmetric Community Key. Each Community Key (e.g. C1b) is encrypted with the certificate (e.g. 235) containing the public key of the associated User (e.g. 211). Note that a User (e.g. User2 212) may belong to multiple communities (e.g. 201, 203) and therefore may have multiple Encrypted Community Keys (e.g. 242, 243), each being encrypted with that user's (e.g. User2 212) public key (e.g. 236, 237), preferably using the public key associated with the encryption credentials. Encrypted Community Keys may include Parameters. There may be a separate Community Key each time the membership of a community changes. For example, there may be multiple versions of Encrypted Community Keys 240 in the case where Workspace Keys have changed.

Encrypted Workspace Keys 250 are used to control sets of Encrypted Content Keys 260. Each Workspace Key (e.g. W1) is encrypted with a Community Key (e.g. C1b) associated with that Workspace (e.g. 271). Encrypted Workspace Keys 250 may also include Parameters. There may be multiple versions of Encrypted Workspace Keys 250, for example, in the case where Encrypted Content Keys 260 have changed.

Encrypted Content Keys 260 are used to encrypt the corresponding item of Encrypted Content 280. Each Content Key (e.g. D1, D2, D3) may be encrypted with the associated Workspace Key (e.g. W1). Encrypted Content Keys may also include Parameters such as name, location, size, keywords etc. Encrypted Content Keys (e.g. 261) may be stored with the Encrypted Content (e.g. 281). Note that if Content (e.g. 283) is shared between Workspaces (e.g. 271, 273), then the Content Key (e.g. D3) may be encrypted by the corresponding Workspace Key (e.g. W1, W3) in each associated Workspace (e.g. 231, 233 respectively).

Workspaces 270 are another representation of those shown in FIG. 1. Workspaces 270 represent any combination of Encrypted Content 280. Each Workspace (e.g. Workspace1 271) may have one or more versions of associated Workspace Keys (e.g. W1). Each Workspace (e.g. Workspace1 271) may be associated with a Community (e.g. Community1 201).

Encrypted Content is another representation of those shown in FIG. 1. Encrypted Content (e.g. 281) is encrypted by Client Controllers (e.g. 221) using an associated Content Key (e.g. D1). Encrypted Content (e.g. 281) may be signed by a private key (e.g. a signing key 224*a* not shown) of the User (e.g. 211) that stored the Encrypted Content (e.g. 281).

Storage Service 290 is another representation of Storage Service 160 shown in FIG. 1. Storage Service 290 is where Encrypted Content 260 may be stored. Other information such as some or all of Permits 230 information may also be stored in Storage 290. Any of the stored information may be distributed and/or replicated among any number or any type of Storage Services 290 e.g. disks, file servers, third party storage services etc. For example, in FIG. 2, Encrypted Content 281 and 282 are stored in Store1 291 and a copy and/or different version of Encrypted Content 282 is also stored in Store2 292. Note also that some Encrypted Content (e.g. 284) may be transient and/or stored by the Client Controller locally (e.g. in memory, local disk) and not necessarily in Storage vice 290 (e.g. 284).

Permit Management

With reference to FIG. 1, Permits 152 and/or individual parts of Permits may be shared between Client Controllers 140 in several ways, such as directly (peer-to-peer) and/or via shared storage (non-real-time peer-to-peer) such as Storage Service 160 and/or via a separate service, such as a Permit Service 180.

For example in FIG. 2, if Client Controller 221 updates Permit1 231, and subsequently Client Controller 222 needs to use Permit1 231 related information, then the updated Permit1 231 or parts of the Permit1 231 may be retrieved from a Permit Service and/or shared Storage 290 and/or by copying Permit1 231 from Client Controller 221. Additionally, Client Controllers may cache Permits and/or Permit information. These actions may also be restricted by policies which define constraints on functions and flows within the system. For example policies may include defining rights, privileges, access controls, operational controls etc. Such policies may be stored as Parameters in a Permit (e.g. 232).

Sharing Permits using Peer-to-Peer

Client Controllers may propagate particular Permit updates directly to and/or from other Client Controllers who rely on information in that Permit. This may be via a "push" where the updates are distributed from the source Client Controller and/or via a "pull" where the updates are fetched from another Client Controller. The mechanism(s) to communicate with associated Client Controllers may be stored as Parameters in the Permit (e.g. 231). A particular Client Controller (e.g. 221) may only need to maintain relevant Permits (e.g. 231) for their associated User (e.g. 211).

Sharing Permits Using Storage (Non-Real-Time Peer-to-Peer)

Client Controllers may use Storage Service 290 to directly distribute and/or replicate all and/or parts of Permits. For example, Client Controller 221 who updates Permit1 231 may copy Permit1 231 to Storage 290. Client Controller 222 may then retrieve it at a necessary time. The mechanism(s) to communicate with Storage Service 290 may be stored as Parameters in the Permit (e.g. 232). Permits may be replicated within and/or across Storage Services 290 such as for performance or availability reasons.

Sharing Permits Using a Permit Service

With reference to FIG. 1, Client Controllers 140 may obtain, manage and update Permit information 152 using a separate Permit Service 180. This Permit Service 180 may be local and/or remote, may be distributed and/or replicated and/or may operate using entire Permits and/or parts of Permits. In order to access a Permit Service 180, a Client Controller 140 may need to first connect to the Permit Service 180 with appropriate credentials, for example with those setup when the User 100 was first initialised into the System 120.

Permit Operations

With reference to FIG. 1, Permits 152 represent any information that Client Controllers 140 need to perform operations on Encrypted Content 151 such as encrypting, decrypting, accessing and managing them. The entire Permit and/or individual parts of the Permit may be encrypted and/or may reside in a Permit Service 180 and/or Client Controllers 140 and/or one or more Storage Services 160. For example, Permit Service 180 may contain user and workspace information (e.g. certificates, encrypted community keys, encrypted workspace keys and/or related Parameters), Client Controllers may cache Permit information (e.g. certificates, derived decrypted keys and/or controls) and/or Storage Service 160 may contain content related information (e.g. Encrypted Content Keys and/or Parameters).

Decrypting Information in a Permit

With reference to FIG. 2, a User (e.g. 211), belonging to one or more communities (e.g. 201) may obtain keys and/or Parameters from their Permit(s) (e.g. 231) using their Client Controller (e.g. 221) by decrypting the relevant keys. For example:

- If an entire Permit (e.g. 231) is encrypted, then it may be decrypted using the private key (e.g. 224) associated with the Client Controller (e.g. 221) of that User (e.g. User1 211). Alternatively, the Permit (e.g. 231) may be decrypted by obtaining the Community Key (e.g. C1b) (as described below) and then decrypting the remainder of the Permit (e.g. 231) using the Community Key (e.g. C1b).
- A Community Key (e.g. C1b) may be obtained by using the private key (e.g. 224) associated with the Client Controller (e.g. 221) to decrypt an Encrypted Community Key (e.g. 241). Other Parameters may also be contained within the Encrypted Community Key (e.g. 241) or separately (e.g. 232) such as information about the Workspace associated with that Community (e.g. 201).
- A Workspace Key (e.g. W1) may be obtained by using an associated Community Key (e.g. C1b) to decrypt an Encrypted Workspace Key (e.g. 251). Other Parameters may also be obtained, such as information about content in the workspace e.g. their names, size, type, location, store credentials, alternative stores etc.
- A Content Key (e.g. D1) may be obtained by using an associated Workspace Key (e.g. W1) to decrypt an Encrypted Content Key (e.g. 261). Other Parameters may also be obtained, such as store location, credentials, restrictions, copies or other content information.

Encrypting Information in a Permit

With reference to FIG. 2, a User (e.g. 211), belonging to one or more communities (e.g. 201) may add or replace all or some of information in a Permit (e.g. 231) using their associated Client Controller (e.g. 221) by encrypting relevant keys and/or Parameters. For example:

- An Encrypted Content Key (e.g. 263) may be generated using a Workspace Key (e.g. W1) to encrypt a Content Key (e.g. D3). Parameters may be included such as content properties. If replacing Encrypted Content, the old Encrypted Content Key may be removed from the Permit (e.g. 231), or alternatively, the old Encrypted Content Key may be flagged with version information in the Permit (e.g. 231).
- An Encrypted Workspace Key (e.g. 251) may be generated using a Community Key (e.g. C1b), to encrypt a Workspace Key (e.g. W1). Parameters may be included such as information about content in the workspace e.g. their names, size, type, location, store credentials, alternative stores etc. If replacing an Encrypted Workspace Key, the old Encrypted Workspace Key may be removed from a Permit (e.g. 231), or alternatively, the old Encrypted Workspace Key may be flagged with version information in a Permit (e.g. 231).

An Encrypted Community Key (e.g. 241) may be generated by using an associated public key (e.g. 235) to encrypt the Community Key (e.g. C1b). This operation may involve checking for revocation of the certificate containing the public key. Parameters may be included such as information about the Community and or Workspace and/or Content. If replacing an Encrypted Community Key (e.g. C1a not shown), the old Encrypted Community Key (e.g. C1a not shown) may be removed from the Permit (e.g. 231), or alternatively, the old Encrypted Community Key may be flagged with version information in the Permit (e.g. 231), and the new Community Key (e.g. C1b) needs to be encrypted with the public key (e.g. 235, 236) of each user of that Community (e.g. 211, 212).

An entire Permit (e.g. 231) may be encrypted using an associated public key (e.g. 235) of the User (e.g. 211) who is sharing that Permit (e.g. 231). This may involve checking for revocation.

Alternatively, a portion of the Permit (e.g. 231) may be encrypted using the Community Key (e.g. C1b). For example, the portion may be Parameters (e.g. 232). In another example, the portion may be the entire Permit (e.g. 231) except for the Encrypted Community Key (e.g. 241).

Transitioning Information in a Permit

Updating a Permit (e.g. 231) may involve multiple operations and may occur over a period of time. By effectively versioning the Permit information, such as keys and/or Parameters, the system can continue to operate during the update of a Permit. This mechanism of progressive update also enables operations to be restarted or rolled back.

For example, a process for updating a Workspace Key (e.g. W1) may involve one or more of the following steps, not necessarily in order:

Adding a new Encrypted Workspace Key (e.g. 251*a* not shown in FIG. 2)

Replacing each Encrypted Community Keys (e.g. 241, 242)

Replacing Encrypted Content Keys (e.g. 261, 262, 263)

Removing the old Encrypted Workspace Key (e.g. 251).

In transition, a User (e.g. 211) may continue to operate because the User may obtain the old or the new Encrypted Workspace Key and/or the new Encrypted Content Keys. After the process is complete, a User (e.g. 211) will have transitioned to the new Encrypted Workspace Key (e.g. W1a not shown in FIG. 2).

Any given update to a Permit (e.g. 231) may also be restarted or rolled back. For a restart, the process can be continued from the point that it was interrupted. For a rollback, the process can be undone by proceeding backwards, from the point where the process stopped, at each step, reversing each operation that was applied at that point in the process.

Encrypted Content Management

With reference to FIG. 1, Users 100 may use Client Controllers 140 to manage Encrypted Content 151. Encrypted Content 151 may be in streams and/or discrete units and/or may be stored in Storage Service 160. Policies regarding the management of Encrypted Content may be stored in Permits. Example policies may including using multiple Storage Service 160 providers, keeping backup copies, keeping older versions, content update locking mechanisms, history, statistics, segmentation rules, streaming parameters etc.

Sharing Encrypted Content Using Peer-to-Peer

Client Controllers may share particular Encrypted Content directly to and/or from other Client Controllers. The mechanism(s) to communicate with associated Client Controllers may be stored as Parameters in a Permit (e.g. 231). An interaction may be via a "push" where the Encrypted Content communication is initiated from the source Client Controller and/or via a "pull" where the Encrypted Content is fetched from another Client Controller. Encrypted Content may be discrete units such as a file or "blob" or may be shared using one or more streams to other Client Controllers.

Storing Encrypted Content

Client Controllers may store all or some of Encrypted Content 280 in a Storage Service 290. The Storage Service 290 may be local and/or remote. A given item of Encrypted Content (e.g. 282) may be replicated into different locations within a Storage Service 290 or using different Storage Services (e.g. 291, 292) such as for performance or availability reasons. Information about Encrypted Content (e.g. 283), where it is stored and how it can be accessed may be maintained in associated Permits 230 (e.g. 231, 233).

Retrieving Encrypted Content

Client Controllers may retrieve Encrypted Content 280 from Storage Service 290. Details such as names, descriptions, locations and credentials required to access the Storage Service 290 may be stored in an associated Permit(s).

Encrypted Content Operations

With reference to FIG. 1, Users 100 may use Client Controllers 140 to import and/or export Content 110 into/from System 120. If Content 110 is a stream, then the import and/or export may be in a continuous form.

Exporting Content

With reference to FIG. 2, a User (e.g. User1 211) belonging to given community (e.g. Community1 201) may use their Client Controller (e.g. 221) to export Encrypted Content (e.g. 281) for local usage such as to view, verify and/or save. To do so, one or more of the following steps, not necessarily in order, may be performed:

Obtain Parameters about the Content (e.g. Data1) to be exported. For example, allow the user to choose a Workspace (e.g. Workspace1 271) and Content (e.g. Data1) from that Workspace using information in the relevant Permit (e.g. Permit1 231). Multiple Content items may be selected.

Check Parameters for permission to export Encrypted Content (e.g. 281). For example, if the user has the appropriate rights, etc.

If the Client Controller needs to, download Encrypted Content (e.g. 281) from the Storage Service (e.g. Store1 291) or another Client Controller. Multiple Content items may be downloaded.

Obtain Content Key (e.g. D1) from relevant Permit (e.g. Permit1 231) as previously described.

Obtain Content (e.g. Data1 281) by decrypting the Encrypted Content (e.g. 281) using an associated Content Key (e.g. D1). If Encrypted Content is a stream, then Content may also be a stream.

Optionally, audit and/or notify other Users (e.g. 212) that Content has been accessed.

If the Content (e.g. Data1) is signed, optionally obtain the Certificate (e.g. U1) of the purported author (e.g. User1

211) and check the signature against it. This may involve checking for revocation and/or checking and validating time-stamp information, for example using a trusted time-stamping service.

If necessary, perform further processing on the Content (e.g. Data1) such as de-compressing, de-packaging, etc.

View and/or Save the Content locally as required.

Importing Content

With reference to FIG. 2, a User (e.g. User1 212) may use their Client Controller (e.g. 222) to import Content (e.g. Data3). To do so, one or more of the following steps, not necessarily in order, may be performed:

Check Parameters for permission to import Content. For example, if the user has the appropriate rights, etc.

Optionally sign the Content (e.g. Data3) using user's (signing) private key (e.g. u2a not shown in FIG. 2). This may involve also including a signed timestamp, for example using a trusted time-stamping service. Other operations may also be performed on Content such as being transformed e.g. compressed, packaged from a set of files, versioned, watermarked etc.

Generate a random Content Key (e.g. D3). If replacing the Content and the Content is marked as shared between Workspaces and the user does not have access to each of the overlapping Workspaces, then the existing Content Key may be used.

Encrypt the Content (e.g. Data3) using the Content Key (e.g. D3) in order to obtain Encrypted Content (e.g. 283). If Content is a stream then additional Message Authentication Codes may be added into the stream at pre-determined intervals and/or a streaming cipher may be used.

If required, upload the Encrypted Content (e.g. 283) to Storage Service 290 (e.g. Store2 292) and/or other Client Controllers. Additional copies may also be uploaded to Storage Service 290 for example, to improve availability or for backup. If Content is a stream, then associated streams may be opened to other Client Controllers and/or Storage Services.

Optionally, audit and/or notify other Users (e.g. 211, 213) that content has been created or modified.

Update the Permit(s) in associated Workspace(s) as described below.

Interacting with Content Streams

With reference to FIG. 1, a User 100 and/or an Application 101 may interact with a Content Stream from an associated Client Controller 141. To do so, one or more of the following steps, not necessarily in order, may be performed:

Obtain a Content Key for the Stream. If the stream exists then this may be by retrieving the Content Key from the Permit (as described above). If the stream does not exist, then this may be by generating and publishing a Content Key in an associated Permit (as described above) for a new stream.

Open the Stream. Parameters in the associated Permit may indicate the mode, such as read-only, write-only or read-write and mechanisms, such as type of cipher, cipher parameters cipher mode(s) to use.

Manage the Stream according to Parameters in the Permit, such as the frequency to insert, expect and process Message Authentication Codes (MACS), when to close a stream and store as a historical attachment and open a new stream with a new Content Key etc.

Monitor associated Permit for changes in associated Community. If a new User is added, then a new Content Key (as previously described) and Stream may need to be generated to prevent the new User from reading the history of a stream. If a User is removed from the Community then a new Workspace Key, Content Key (as previously described) and Stream may need to be generated to prevent the deleted User from reading new Content Keys.

Workspace Management

With reference to FIG. 2, Users 210 may use their Client Controllers 220 to manage, for example create and remove, Workspaces 270 by updating information in associated Permits 230. These actions may be restricted by Parameters, such as having rights to create and/or remove Workspaces.

Creating a Workspace

A User (e.g. User3 213) or special user (e.g. system administrator) may create a Workspace (e.g. Workspace3 273). To do so, one or more of the following steps, not necessarily in order, may be performed:

Choose a name for the workspace as well as other predetermined criteria

Check Parameters for permission to create a Workspace. For example, if the user has the appropriate rights, the workspace name isn't currently used, etc.

Generate a random Workspace Key (e.g. W3)

Generate Encrypted Workspace Key (e.g. 253) by encrypting Workspace Key (e.g. W3) with Community Key (e.g. C3a). This may involve obtaining the Community Key (e.g. C3a) by decrypting an Encrypted Community Key (e.g. 244)

Store Encrypted Workspace Key (e.g. 253) and other associated Parameters in associated Permit (e.g. Permit3 233).

Removing a Workspace

A User (e.g. User3 213) or special user (e.g. system administrator) may remove a Workspace (e.g. Workspace3 273). To do so, one or more of the following steps, not necessarily in order, may be performed:

Check Parameters for permission to remove the Workspace. For example, if the Workspace needs to be empty, if the User has appropriate rights, if the User is the owner of the Workspace etc.

Check Parameters about whether keys and/or content need to be removed or flagged as removed.

Remove, or flag as removed, the Encrypted Workspace Key(s) (e.g. 253) from the associated Permit (e.g. Permit3 233).

Remove, or flag as removed, the related Encrypted Content Key(s) (e.g. 264, 265) from the associated Permit (e.g. Permit3 233)

Optionally remove the Encrypted Content (e.g. 283, 284) from Storage 290 (e.g. Store2 292).

Optionally audit and/or notify other members of the Community (e.g. Community3 203) that the Workspace (e.g. Workspace3 273) has been removed.

Optionally generate a new Community Key in order to make sure that a new community user cannot decrypt an old workspace key and/or old encrypted content.

Workspace Operations

With reference to FIG. 2, a User (e.g. 211) may use a Client Controller (e.g. 221) and information contained in associated Permits (e.g. Permit1 231) to perform operations on the set of Encrypted Content 280 within a Workspace (e.g. 271), such as create, replace, and remove. An individual Encrypted Content item (e.g. 283) may be added to multiple Workspaces (e.g. 271, 273).

Adding Encrypted Content to a Workspace

After importing Encrypted Content (e.g. 283), a Client Controller (e.g. 221) may need to update one or more associated Permits (e.g. Permit1 231). To do so, one or more of the following steps, not necessarily in order, may be performed:

Check Parameters for permission to create Encrypted Content. For example, if the user has the appropriate rights, the Encrypted Content name isn't currently used, etc. If Encrypted Content is to be shared between two (overlapping) Workspaces, then the user may need to be a member of each of the associated Communities.

Obtain Workspace information, such as Parameters and Workspace Key (e.g. W1) from relevant Permit(s) (e.g. Permit1 231, 233) as previously described.

Generate Encrypted Content Key(s) (e.g. 263, 264) by encrypting the Content Key (e.g. D3) with associated Workspace Key(s) (e.g. W1, W3). Parameters may be included. Store Encrypted Content Key(s) (e.g. 263, 264) in associated Permit(s) (e.g. 231, 233).

Add Parameters to Permit(s) about the new content such as its name, size, location, version etc. Parameters may be encrypted, for example with Community Key(s) (e.g. C1b, C3a) and/or Workspace Key(s) (e.g. W1, W3).

If replacing Encrypted Content, remove old Encrypted Content Key(s) from associated Permit(s) or, alternatively, flag old Encrypted Content Key(s) with version information in associated Permit(s).

Removing Encrypted Content from a Workspace

A Client Controller (e.g. 222) may remove Encrypted Content (e.g. 282) by updating the associated Permit (e.g. Permit1 231). To do so, one or more of the following steps, not necessarily in order, may be performed:

Check Parameters for permission to remove Encrypted Content. For example, if the User is the owner of the Encrypted Content and/or Workspace, if the User has appropriate rights, if the associated Workspace or Encrypted Content isn't locked etc.

Obtain workspace information, such as Parameters and Workspace Key (e.g. W1) from a relevant Permit (e.g. Permit1 231) as previously described.

Optionally check Parameters or other policy about whether this User (e.g. 212) may delete this Encrypted Content (e.g. 282). For example, policies may restrict who can remove Encrypted Content e.g. author, owner of workspace, administrator, privileged user etc.

Remove the old Encrypted Content Key and related Parameters from the Permit 230 for that Content (e.g. Data2) and/or remove the Encrypted Content (e.g. 282) and/or including replicas from the Storage Service (e.g. 291, 292). Alternatively, flag the old Encrypted Content Key with version information in associated Permit.

Distributing Encrypted Content Streams

Encrypted Content may be shared using one or more streams to other Client Controllers. With reference to FIG. 2, a Workspace (e.g. 271) may contain a Stream (e.g. Data2) which members of an associated Community (e.g. 201) may participate in. To do so, one or more of the following steps, not necessarily in order, may be performed:

A Client Controller may open streams to other Client Controllers in the Community.

If a Client Controller receives Content it may encrypt it (as previously described) and my pass it on to other Client Controllers.

If a Client Controller receives Encrypted Content from another Client Controller, it may pass that on providing that it has not already done so before. To check for this loop condition, the Client Controller may check previous transmissions, or some derivation such as a hash of a previous transmission.

If a Stream is closed and re-opened then corresponding streams to other Client Controllers may need to be closed and re-opened. This may involve saving the stream as an attachment in the Workspace.

If information in a Permit is changed relating to the Stream, for example Parameters or a new Content Key, then the Client Controller may publish this changed Permit to other Client Controllers.

Community Management

With reference to FIG. 2, Users 210 may use their Client Controllers 220 to manage, for example create and/or remove, Communities 200 by updating information in an associated Permits 230. These actions may also be restricted by Parameters, such as having appropriate rights.

Creating a Community

A User (e.g. User3 213) or special user (e.g. system administrator) may create a Community (e.g. Community3 203). To do so, one or more of the following steps, not necessarily in order, may be performed:

Choose a name for the community as well as other predetermined criteria.

Check Parameters for permission to create a Community. For example, if the user has the appropriate rights, the community name isn't currently used, etc.

Generate a random Community Key (e.g. C3a)

Generate Encrypted Community Key (e.g. 244) for the owner (e.g. User3 213) of that community by encrypting Community Key (e.g. C3a) with the certificate (e.g. 238) of the owner. This may include checking for revocation.

Store Encrypted Community Key (e.g. 244) in an associated Permit (e.g. Permit3 233).

Removing a Community

A User (e.g. User3 213) or special user (e.g. system administrator) may remove a Community (e.g. Community3 203). To do so, one or more of the following steps, not necessarily in order, may be performed:

Check Parameters for permission to remove the Community. For example, if the User is the owner of the Community, if the removal of the Community doesn't create orphan Users (users that do not belong to a Community), if the User has appropriate rights, if the associated Workspace may be removed by the User etc.

Check Parameters about whether Permit information need to be removed or flagged as removed.

Remove, or flag as removed, the Encrypted Community Key(s) (e.g. 243, 244) from the associated Permit (e.g. Permit3 233).

Remove, or flag as removed, the related Workspace (e.g. Workspace3 272) as previously described.

Optionally audit and/or notify other members (e.g. User2 212) of the Community (e.g. Community3 203) that a Community (e.g. 203) has been removed.

Community Operations

Users 210 may use their Client Controllers 220 to invite or remove another Users 210 to/from Communities 200.

Adding a User to a Community

A User (e.g. User2 212) or special user (e.g. system administrator) may be added to a Community (e.g. Community3 203). To do so, one or more of the following steps, not necessarily in order, may be performed:

Check Parameters for permission to add a User to a Community. For example, if the User is the owner of the Community, if the User has appropriate rights, etc.

An Initiator (e.g. User3 213) may invite an Invitee (e.g. User 212) to become a member of a Community (e.g. Community 3 203).

If the Invitee is not currently a User of the System then they may register as described below.

If the Invitee already has a relationship with the Initiator, for example they both currently or have been a member of a particular community, then the invitation may be accepted automatically.

If the Invitee and Initiator both trust the Credential Service, for example they are using an existing Certification Authority, then the invitation may be accepted automatically.

If the Invitee and Initiator are setting up a relationship, then the Initiator (e.g. 213) may provide a "secret" invitation code and/or obtaining Invitee's certificate (e.g. U2 237) from associated Permit (e.g. Permit3 233). The invitation code may be unique and/or be valid for a limited time. If the Invitee (e.g. 212) accepts the invitation, then they may return the "secret" invitation code and/or their certificate and/or certificate fingerprint to the Initiator (e.g. 213).

Initiator (e.g. 213) checks Invitee's (e.g. 212) acceptance. This may involve checking the "secret" invitation code, checking the certificate, checking the certificate fingerprint etc.

Initiator (e.g. 213) stores information in associated Permit (e.g. 233). This may include storing an Encrypted Community Key (e.g. 243) using the public key in the certificate of Invitee (e.g. U2 237). It may also include adding Invitee (e.g. 212) to Parameters (e.g. 253) describing the Community and other information such as access Parameters. This may involve checking revocation.

Optionally audit and/or notify members of the Community (e.g. Community3 203) that a User has been added to a Community.

Optionally, generate a new Workspace Key and re-encrypting the Content Keys in the associated Workspace (e.g. Workspace3 273). This may be to ensure that the new user cannot decrypt Content that that has previously been deleted from the Workspace.

Removing a User from a Community

A User (e.g. User1 211) may remove another User (e.g. User2 212) from a Community (e.g. Community1 201). To do so, one or more of the following steps not necessarily in order may be performed:

Check Parameters for permission to remove a User from a Community.

For example, if the User is the owner of the Community, if the removal of the User doesn't create an empty Community, if the removal of a User doesn't result in an orphan User (such that they do not belong to any Community), if the User has appropriate rights, etc. If the User is being removed from the System, then a different set of checks may be performed, as described below.

Update associated Permit (e.g. 231) to remove the User (e.g. 212) from Parameters (e.g. 232, 251) describing the Community (e.g. 201) or other information e.g. access Parameter information Generate a new (random) Community Key (e.g. C1c not shown in FIG. 2)

Update associated Permit (e.g. 231) to remove the previous Encrypted Community Key (e.g. 242)

Re-encrypt this Community Key (e.g. C1c not shown in FIG. 2) for each other user in the Community using their respective certificates (public key) (e.g. 235) and update associated Permit (e.g. 231)

Generate one or more new Workspace Key(s) (e.g. W1b not shown in FIG. 2), re-encrypt the Content Keys in that Workspace and update the associated Permit (e.g. 231). This may be to ensure that the user being deleted cannot decrypt new Content being placed in the Workspace.

User Management

With reference to FIG. 1, Users 100 may be added or removed from the System 120. These actions may also be restricted by Parameters, such as policies and/or workflow processes.

In the case of a pre-defined community, for example employees in an enterprise, members of an organisation, subscribers to a service etc, where credentials are already managed, the addition and/or removal of Users 100 into System 120 may be fully or partly automatic.

Initialising a User into the System

With reference to FIG. 1 a new User 100 may be initialised into the System 120. To do so, one or more of the following steps, not necessarily in order, may be performed:

The new User 100 obtains Client Controller 140 software, e.g. via a website, personal contact, email, enterprise server etc.

The new User 100 obtains Credentials 142 from a Credential Service 170. This may be via manual means or using the Client Controller 140. Examples of a Credential Service 170 include, a web site, a Certificate Authority, an online Certification Service, an authentication server, a single-sign-on server etc.

Some or all of the credentials may be pre-existing. Examples of pre-existing credentials include enterprises or organisations or closed communities which already make use of and identity infrastructure such as a private certificate infrastructure, Public Key Infrastructure (PKI) and/or third party service. There may be different credentials for different purposes e.g. signing, encryption, communications.

All or part of the credentials may be generated by the User 100 and/or Client Controller 140 such as a label, identifier, password, private key, public key etc. The Credential Service may use these to generate further forms of credentials e.g. certificates.

Credentials 142 may be stored in Client Controller 140. Some of the Credential information may be stored in the Permit e.g. identifiers, parameters, certificates. Some of the Credential information may only exist in the Client Controllers 140 e.g. private keys.

Each User 100 of the System 120 may be identified by a label. The label may be any type of tag and need not necessarily be related to an identity service or represent or identify anything in the real world e.g. a person, organisation, service etc. Preferably, the label should be unique within the System.

Removing a User from the System

To remove a User from the System, one or more of the following actions may be taken:

Removal of a User may be subject to Parameters and/or a workflow process.

Certificates issued to the User being removed may need to be revoked as described below.

The User may be removed from each community which that User is a member of and the corresponding Permits updated as previously described.

A User may also be flagged as inactive, suspended, disabled and/or other states rather than being removed. In this case, appropriate Permits may need to be updated.

If a User is the owner of a Community, then removing that user may require another member of that Community to become the owner of that Community If a User is the owner of a Workspace, then removing that user may require another member of the associated Community to become owner of that Workspace.

In the case of stolen credentials, or other situations of extreme prejudice such as a rogue user, then all keys and documents relating to that user may need to be removed from the System.

User Operations

With reference to FIG. 1, Users 100 may need to authenticate to the System 120. Additionally, Client Controllers 140 may need to authenticate to other system components such as Credential Service 170, Permit Service 180 and/or Storage Service 160. The credentials used may be communications credentials.

Logging into the Client Controller

With reference to FIG. 1, Users 100 may login to their Client Controller 140 using appropriate Credentials 142 such as username, password, tokens, tickets etc. Client Controller 140 may store the Credentials locally e.g. using a cryptographic key store. Credentials 142 may also be verified using Credential Service 170, such a single-sign-on server, Kerberos server, Security Assertion Mark-up Language (SAML) server or any other type of ticketing or authentication server or service.

Logging into System Services

With reference to FIG. 1, Client Controllers may need to login into System Services such as Credential Service 170, Permit Service 180, Storage Service 160 or any other service such as authentication service, escrow service, registration service etc. To do so, Client Controllers 140 may use Credentials 142 and/or information in Permit(s) 152 and/or any other predefined criteria.

Credential Management

With reference to FIG. 1, a User 100 may obtain credentials from Credential Service 170. This may be when User 100 is first registered in the System 120, or may occur each time User logs into Client Controllers 140 in the case where Credentials 142 are not permanently stored in Client Controller 140.

Obtaining Credentials Using a Certificate Service

Figure 3:
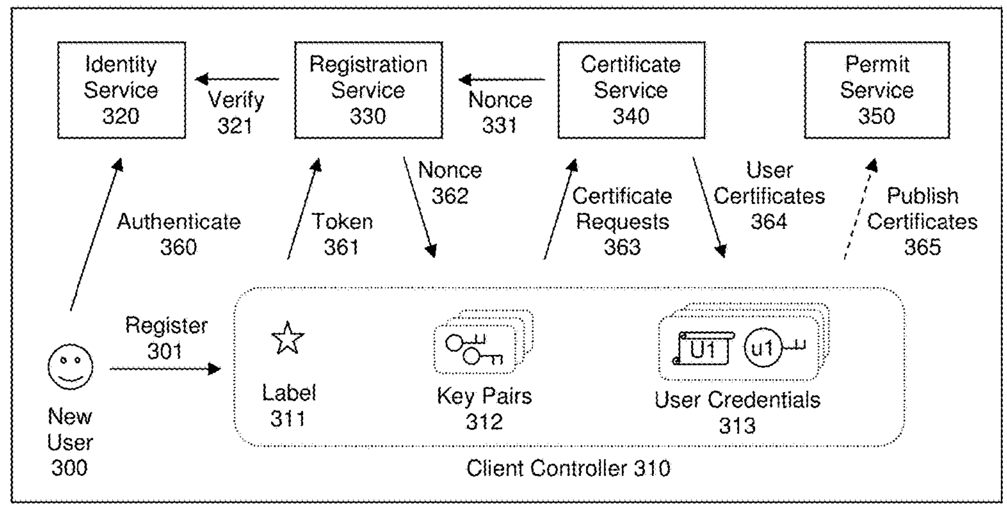
FIG. 3 illustrates a process of initialisation in an embodiment of the present invention.

With reference to FIG. 3, a New User 300 may obtain certificate based User Credentials 313 using their Client Controller 310. The Credential Service as shown in FIG. 1 may be functionally considered to comprise one or more of an Identity Service 320, Registration Service 330 and/or Certificate Service 340 as shown in FIG. 3. Any one or any combination of these Services may be provided externally, for example by making use of a website, a third-party service and/or enterprise servers. The Client Controller 310 may need to obtain associated trusted certificates or other credentials prior to setting up User Credentials 313. If an existing certificate infrastructure is being used, then the User Credentials 313 may be obtained by other means, such as an Escrow Service (described below), manual means or through an Application Programming Interface (API).

With reference to FIG. 3, to setup User Credentials 313, one or more of the following steps, not necessarily in order, may be performed:

New User 300 may Authenticate 360 to an Identity Service 320. This may be for the purpose of registering, for example via a web site, or may be part of their normal practices, for example logging into a corporate network. The Identity Service 420 may provide a mechanism to prove the login, for example a ticket, token or session identifier.

New User 300 may Register 301 for example, as the result of an invitation or as part of the initialisation of the Client Controller 310. If existing credentials are being used, then the entire registration process may be automatic.

Client Controller 310 may connect to Registration Service 330 and may provide additional information such as a Token 361 and/or Label 311. The Label 311 may be provided by the New User 300 and/or be generated by the Client Controller 310. The Label 311 may be related to the account used to Authenticate 360. If the Label 311 is unrelated to the account used to Authenticate 360, then the Registration Service 330 may need to maintain the mapping between the Label 311 and the account used to Authenticate 360, for example where User Credentials 313 need to be re-issued or are revoked. The Label 331 may be any string or number such as an account name, email address, pseudonym, code or random string. The Label 311 may be obtained using any mechanism e.g. manually input, generated or imported, from any source e.g. from the New User 300, the Client Controller 310, the Identity Service 320 and/or the Registration Service 330. The label need necessarily not identify a real object such as a user, organisation, web service, account etc. In a preferred embodiment, the Label should be unique within the system.

The Registration Service 330 may Verify 321 the identity of New User 300 e.g. using information provided such as a Token 361. For example, if Identity Service 320 was an enterprise access service e.g. web single-sign-on, enterprise single-sign-on, corporate directory, Kerberos server etc, then Token 361 would be a corresponding authorisation such as a ticket, session identifier, assertion or cookie. In another example, if Label 311 is an email address, then Registration Service 330 may Verify 321 the email address by sending an email to the New User 300 with a secret, for example a string or code, which New User 300 will need to supply as Token 361. The Registration Service 330 may perform other checks, such as verifying that Label 311 is not being used by another user, checking system policies etc. Note that in the case of re-issuing credentials (described below) the Label 311 may need to be the same as that used when New User 300 first registered.

The Registration Service 330 may acknowledge the enrolment with a Nonce 362. In this step, the Certificate Service 340 may be contacted, using pre-determined criteria, to obtain a Nonce 331 and optionally other information. "Nonce" stands for "number only used once" which is provided for a following certification request. Other information provided by the Registration Service 330 may include certificate policy information and cryptographically strong seed material to help with key generation.

Client Controller 310 may generate Certification Requests 363. To do so, the Client Controller 310 may generate Key Pairs 312, such as public and private key pairs. Different Key Pairs 312 may be for different purposes such as signing, encryption and communications e.g. Secure Sockets Layer (SSL). The generation process may use seed material provided by the Registration Service 330 and/or take place using a Hardware Security Module (HSM). The private keys preferably remain with the Client Controller 310. The public keys and optionally nonce information are used to form Certification Requests 363 made to the Certificate Service 340. The Certificate Requests 363 may be in a standard form, such as a Public-Key Cryptography Standard 10 (PKCS#10) Certification Request.

The Certificate Service 340 may issue User Certificates 364 according to pre-defined criteria. For example, if the requests are valid, if the New User 300 satisfies system policies etc. The User Certificates 364 may be in a standard form, such as X.509 certificates. The User Certificates 364 may be signed using the root certification path such as trusted certificates. The trusted certificates, or related trust anchor certificate(s), may be embedded in the Client Controller 300 and/or other system components if used, such as the Permit Service 350. If a Label 311 is supplied, it may be used as the source for all or part of the Subject in the User Certificates 364.

The Client Controller 310 may associate each User Certificate 364 with the corresponding private key, the combination forming a User Credential 313.

User Certificates 364 may be published to the Permit Service 350. The Permit Service 350 may use the Certificate Subject and/or Issuer and/or Serial Number and/or other mechanism to associate the New User 300 with the User Certificates 365. The Client Controller 310 may publish only selected certificates, such as signing and encryption certificates.

Obtaining Credentials Using an Escrow Service

Figure 4:
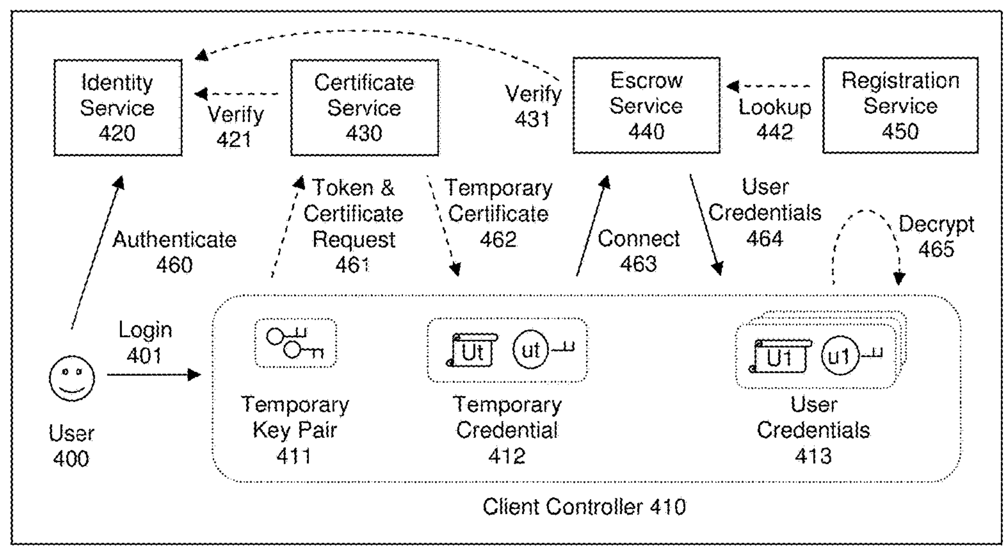
FIG. 4 illustrates a process of access in an embodiment of the present invention.

With reference to FIG. 4, a User 400 may use an Identity Service 420 to obtain credentials and/or login to the system. The reason may be that the Client Controller 410 may not store Credentials 413 for example for security reasons, remote access reasons or for credential recovery (described below). To obtain escrowed credentials, one or more of the following steps, not necessarily in order, may be performed:

User 400 provides credentials such as username, password, etc. in order to Authenticate 460 to an Identity Service 420. This may be part of normal practices, for example logging into a corporate network. Alternatively, User 400 may use Client Controller 410 to Authenticate 460 to the Identity Server 420 by providing credentials with Login 401. The Identity Service 420 may provide a mechanism to prove the login, for example a ticket, token, session identifier, cookie etc.

If the Escrow Service 440 requires certificate based credentials, then Client Controller 410 may generate a Temporary Key Pair 411 and provide identifying information such as a Token with a Certificate Request 461 to Certificate Service 430. Certificate Service 430 may Verify 421 the Token with the Identity Service 420 and may perform other checks, such as checking the validity of Certificate Request 461 and other predetermined criteria prior to issuing a Temporary Certificate 462. The Client Controller 410 may use the Temporary Certificate 462 to form a Temporary Credential 412 and may use this to Connect 463 to an Escrow Service 440.

The Escrow Service 440 may use certificate information provided on a Connect 463 to identify User 400. If other credentials are provided on Connect 463, then Escrow Service 440 may need to Verify 431 identifying information to Identity Service 420. If a label is provided by User 400 and is not related to the account being used in Identity Service 420, then Escrow Service 440 may need to Verify 442 with the Registration Service 450 that the label and identifying information match. Escrow Service 440, after appropriate checking, may return User Credentials 464 to the Client Controller 410. Escrow Service 440 may use an encrypted link and/or return credentials in an encrypted form.

If Escrow Service 440 returns User Credentials 464 in an encrypted form, then Client Controller 410 may Decrypt 465 them in order to obtain User Credentials 413. The password or other mechanism to Decrypt 465 may be provided by the User 400.

Client Controller may use User Credentials 413 to login to other System Services as previously described.

Revoking Credentials

When Certificate Service 340 is informed that credentials of a User need to be revoked, then one or more of the following actions may occur:

Marking the User as revoked within the Certificate Service 340

Adding the User's revoked certificates to relevant Certificate Revocation Lists (CRLs)

Updating information so that a check made with an Online Certificate Status Protocol (OCSP) returns the appropriate revoked response.

Re-Issuing Credentials

In some circumstances, Credentials may need to be re-issued. For example, if certificates expire, credentials become unusable such as if a computer was damaged, a password was forgotten, or credentials were lost and there has been no use of those credentials since the time that they were lost.

With reference to FIG. 3, credentials that can be safely revoked, that is, revoked without prejudice, may be re-issued to a given user with one or more of the following actions may occur:

Certificates may be revoked as described above.

Credentials may be re-issued as outlined above in Obtaining Credentials using a Certificate Service, except that the Label 311 may need to be the same as that was supplied when the User first registered.

If a User whose credentials are being re-issued is the owner of a Community and/or Workspace, then a temporary Community owner and/or Workspace owner may need to be effected. After the completion of the issuance of new credentials, the user may be reverted back to being the owner of relevant Community(s) and/or Workspace(s).

Keys may need to be re-encrypted, as described above in Removing a User from a Community.

Credential Operations

Credentials may be used for different purposes, for example communications, signing and encryption. Where private key operations are required, the private key may obtained from a local keystore or the private key operations may be made using a Hardware Security Module (HSM).

Credentials used in Communications

Credentials relating to communications, such as Secure Sockets Layer (SSL), Transport Layer Security (TLS) etc., may be used for connecting to system services, such as Storage Service 160, Credential Service 170, and Permit Service 180. These Services may need to check for revocation back to the Credential Service 170.

Credentials used in Signing

Credentials relating to signing may be used for signing and/or verifying Content 110.

A User 100 may sign content using their private key. The signing may involve including a separately signed timestamp.

A User may verify the digital signature using the public key in the certificate of that user who signed the content. The verification may include checking for revocation and/or verifying a signed timestamp.

Credentials used in Encryption and Decryption

Credentials relating to encryption may be used for protecting keys as described in sections above relating to Community Keys and Permits. The process for decryption may involve checking for revocation.

General

While this invention has been described in connection with specific embodiments thereof, it will be understood that it is capable of further modification(s). This application is intended to cover any variations uses or adaptations of the invention following in general, the principles of the invention and including such departures from the present disclosure as come within known or customary practice within the art to which the invention pertains and as may be applied to the essential features hereinbefore set forth.

As the present invention may be embodied in several forms without departing from the spirit of the essential characteristics of the invention, it should be understood that the above described embodiments are not to limit the present invention unless otherwise specified, but rather should be construed broadly within the spirit and scope of the invention as defined in the appended claims. The described embodiments are to be considered in all respects as illustrative only and not restrictive.

Various modifications and equivalent arrangements are intended to be included within the spirit and scope of the invention and appended claims. Therefore, the specific embodiments are to be understood to be illustrative of the many ways in which the principles of the present invention may be practiced. In the following claims, means-plus-function clauses are intended to cover structures as performing the defined function and not only structural equivalents, but also equivalent structures. For example, although a nail and a screw may not be structural equivalents in that a nail employs a cylindrical surface to secure wooden parts together, whereas a screw employs a helical surface to secure wooden parts together, in the environment of fastening wooden parts, a nail and a screw are equivalent structures.

It should be noted that where the terms "server", "secure server" or similar terms are used herein, a communication device is described that may be used in a communication system, unless the context otherwise requires, and should not be construed to limit the present invention to any particular communication device type. Thus, a communication device may include, without limitation, a bridge, router, bridge-router (router), switch, node, or other communication device, which may or may not be secure.

It should also be noted that where a flowchart is used herein to demonstrate various aspects of the invention, it should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often, logic elements may be added, modified, omitted, performed in a different order, or implemented using different logic constructs (e.g., logic gates, looping primitives, conditional logic, and other logic constructs) without changing the overall results or otherwise departing from the true scope of the invention.

Various embodiments of the invention may be embodied in many different forms, including computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In an exemplary embodiment of the present invention, predominantly all of the communication between users and the server is implemented as a set of computer program instructions that is converted into a computer executable form, stored as such in a computer readable medium, and executed by a microprocessor under the control of an operating system.

Computer program logic implementing all or part of the functionality where described herein may be embodied in various forms, including a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, EcmaScript or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g. a RAM, ROM, PROM, EEPROM, or Flash-Programmable RAM), a magnetic memory device (e.g., a diskette or fixed disk), an optical memory device (e.g., a CD-ROM or DVD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and inter-networking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality where described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM or DVD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

"Comprises/comprising" and "includes/including" when used in this specification is taken to specify the presence of stated features, integers, steps or components but does not preclude the presence or addition of one or more other features, integers, steps, components or groups thereof. Thus, unless the context clearly requires otherwise, throughout the description and the claims, the words 'comprise', 'comprising', 'includes', 'including' and the like are to be construed in an inclusive sense as opposed to an exclusive or exhaustive sense; that is to say, in the sense of "including, but not limited to".

Throughout this specification the use of words in singular form may be taken as reference to words in plural and vice versa.

The invention claimed is:

1. A method of encrypting and/or decrypting content by a first user having a first computer, using a first permit obtained from a system for sharing content, which has been encrypted, between the first user and a second user having a second computer, the method comprising:

providing the first permit for use by the first user, the first permit having an encrypted first content key for use to encrypt and/or decrypt the content and having an encrypted first workspace key, the first workspace key being independent of the first user and including one or more control parameters associated with the first workspace, for use to encrypt and/or decrypt the first content key;

obtaining by the first computer the first permit and therefrom the encrypted first content key and the encrypted first workspace key;

decrypting by the first computer the encrypted first workspace key to obtain the first workspace key and using the first workspace key to decrypt the encrypted first content key to obtain the first content key;

using by the first computer the first content key to encrypt the content and provide the encrypted content and/or decrypting the encrypted content using the first content key to obtain the content;

using by the second user's second computer a second permit obtained from the system for sharing encrypted content, the second permit having a second encrypted first content key for use to encrypt and/or decrypt the content and having a second encrypted first workspace key for use to encrypt and/or decrypt the first content key;

obtaining by the second computer the second permit and therefrom the second encrypted first content key and the second encrypted first workspace key;

decrypting by the second computer the second encrypted first workspace key to obtain the first workspace key and using the first workspace key to decrypt the encrypted first content key to obtain the first content key; and using by the second computer the first content key to encrypt the content and provide the encrypted content and/or decrypting the encrypted content using the first content key to obtain the content, wherein users sharing the same workspace share a common community key defining the users who are members of a community, the first workspace key being operable to encrypt and/or decrypt using the community key.

2. The method as claimed in claim 1, wherein the first workspace key encrypts and/or decrypts a second content key.

3. The method as claimed in claim 2, wherein the first content key is used to encrypt and/or decrypt first content and the second content key is used to encrypt and/or decrypt second content.

4. The method as claimed in claim 1, wherein the second encrypted first workspace key obtained by the second user is a duplicate of the encrypted first workspace key obtained by the first user.

5. The method as claimed in claim 4, wherein the first content key is only used to encrypt and/or decrypt the first content.

6. The method as claimed in claim 1, wherein the encrypted first content key obtained by the second user is a duplicate of the encrypted first content key obtained by the first user.

7. The method as claimed in claim 1, wherein the first permit provides information necessary for the first user and/or the first computer to perform predetermined operations.

8. The method as claimed in claim 1, wherein the first permit has an encrypted second content key for use with second content.

9. The method as claimed in claim 1, wherein the first permit has an encrypted second workspace key.

10. The method as claimed in claim 9, wherein each workspace key is common to users encrypting and/or decrypting the same content.

11. The method as claimed in claim 1, wherein each computer has a respective private key which enables the respective workspace key(s) and/or respective content key (s) to be obtained from the respective permit.

12. The method as claimed in claim 1, wherein any permit further comprises at least one of:

Certificate(s);
Encrypted key(s);
Parameter(s);
Encrypted Parameter(s);
Parts of parameters;
Information limited to a particular user; and
Information limited to particular content.

13. The method as claimed in claim 1, wherein any permit and/or information contained in the permit is provided via a permit service.

14. The method as claimed in claim 1, wherein the first permit contains information for the first user on a need to know basis.

15. The method as claimed in claim 1, wherein any permit contains information for any user on a need to know basis.

16. The method of claim 1, comprising:

using by the first computer the first content key to encrypt first content and provide the encrypted first content; and using by the first computer the first content key to decrypt encrypted second content using the first content key to obtain the second content.

17. A system for sharing content using encryption and decryption comprising:

a permit source for providing at least first and second permits;

a first computer operative by a first user for-encrypting and/or decrypting content using a first permit obtained from said permit source, and a second computer in communication with said first computer and operative by a second user, for encrypting and/or decrypting content which has been encrypted, wherein said permit source provides the first permit for use by the first user, the first permit having an encrypted first content key, for use to encrypt and/or decrypt the content and having an encrypted first workspace key for use to encrypt and/or decrypt the first content key, the first workspace key being independent of the first user and including one or more control parameters associated with the first workspace;

wherein the first computer obtains the first permit and therefrom the encrypted first content key and the encrypted first workspace key;

wherein the first computer decrypts the encrypted first workspace key to obtain the first workspace key and uses the first workspace key to decrypt the encrypted first content key to obtain the first content key;

wherein the first computer uses the first content key to encrypt the content and provide the encrypted content and/or decrypt the encrypted content using the first content key to obtain the content;

wherein the second computer obtains the second permit from the permit source, the second permit having a second encrypted first content key for use to encrypt and/or decrypt the content and having a second encrypted first workspace key for use to encrypt and/or decrypt the first content key;

wherein the second computer decrypts the second encrypted first workspace key to obtain the first workspace key and uses the first workspace key to decrypt the encrypted first content key to obtain the first content key;

wherein the second computer uses the first content key to encrypt the content and provide the encrypted content and/or uses the first content key to decrypt the encrypted content and obtain the content; and wherein users sharing the same workspace share a common community key defining the users who are members of a community, the first workspace key being operable to encrypt and/or decrypt using the community key.

18. The system as claimed in claim 17, wherein the first workspace key encrypts and/or decrypts a second content key.

19. The system as claimed in claim 18, wherein the first content key is used to encrypt and/or decrypt first content and the second content key is used to encrypt and/or decrypt second content.

20. The system as claimed in claim 17, wherein the encrypted first content key obtained by the second user is a duplicate of the encrypted first content key obtained by the first user.

21. The system as claimed in claim 17, wherein each said first computer and second computer has a respective private key which enables the respective workspace key(s) and/or respective content key(s) to be obtained from the respective permit.

22. The system as claimed in claim 17, wherein each of said first and second permit further comprises at least one of:

Certificate(s);

Encrypted key(s);

Parameter(s);

Encrypted Parameter(s);

Parts of parameters;

Information limited to a particular user; and

Information limited to particular content.

23. The system as claimed in claim 17, wherein any permit and/or information contained in the permit is provided via said permit source.

24. The system of claim 17 wherein:

the first computer uses the first content key to encrypt first content; and the first computer uses the first content key to decrypt encrypted second content.

* * * * *